(12) United States Patent
Mullen et al.

(10) Patent No.: US 9,160,832 B2
(45) Date of Patent: Oct. 13, 2015

(54) ALTERNATE NOTIFICATION SELECTION (71) Applicant: International Business Machines Corporation, Armonk, NY (US)

(72) Inventors: Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/737,057

(22) Filed: Jan. 9, 2013

(65) Prior Publication Data

US 2014/0194101 A1 Jul. 10, 2014

(51) Int. Cl.
*H04M 1/725* (2006.01)
*H04W 4/02* (2009.01)
*H04M 19/04* (2006.01)
*H04W 68/00* (2009.01)

(52) U.S. Cl.
CPC ...... *H04M 1/72519* (2013.01); *H04M 1/72572* (2013.01); *H04M 19/04* (2013.01); *H04W 4/021* (2013.01); *H04W 68/005* (2013.01)

(58) Field of Classification Search
CPC . H04M 19/04; H04M 19/041; H04M 19/047; H04M 3/02; H04M 3/42; H04M 3/42059; H04M 3/42051; H04M 3/42136; H04M 3/42153; H04M 3/42178; H04M 1/72; H04M 1/72572; G10H 2230/021; H04W 68/00
USPC .......... 455/456.1–456.6, 567, 458, 418–420, 455/550.1; 379/373.01–376.02
See application file for complete search history.

(56) References Cited

U.S. PATENT DOCUMENTS

| | | | |
|---|---|---|---|
| 8,027,460 B1 * | 9/2011 | Coughlan et al. | 379/372 |
| 8,041,402 B2 | 10/2011 | Awada et al. | |
| 8,213,396 B1 * | 7/2012 | Oroskar et al. | 370/338 |
| 8,559,924 B1 * | 10/2013 | Henderson | 455/410 |
| 8,805,417 B2 * | 8/2014 | Angiolillo | 455/456.3 |
| 8,838,099 B2 * | 9/2014 | Krco et al. | 455/435.1 |
| 2006/0121949 A1 * | 6/2006 | Awada et al. | 455/567 |
| 2010/0144380 A1 * | 6/2010 | Washburn | 455/466 |
| 2011/0165891 A1 * | 7/2011 | Niemenmaa et al. | 455/456.1 |

* cited by examiner

*Primary Examiner* — George Eng
*Assistant Examiner* — Umair Ahsan
(74) *Attorney, Agent, or Firm* — Lieberman & Brandsdorfer, LLC (57) ABSTRACT

Embodiments of the invention relate to management of notifications responsive to the arrival and departure of mobile devices in a defined area. A prioritized list is shared among mobile devices in a defined area. Upon detection, mobile devices add their respective selected notifications to the prioritized list. A mobile device entering the defined area receives the prioritized list and in response to detecting a shared selected notification on the prioritized list, one of the mobile devices in the area changes its selected notification to an alternative notification. A second mobile device entering the defined area would likewise receive the prioritized list and change its selected notification to a second alternative notification responsive to a shared selected notification on the list. At such time as a device leaves the area, the list is again updated and all notifications exclusive to the device are removed from the list.

18 Claims, 7 Drawing Sheets

ALTERNATE NOTIFICATION SELECTION

BACKGROUND

1. Technical Field

The present invention relates generally to mobile devices and in particular to distinguishing such devices. Still more particularly, the present invention relates to an apparatus and computer instructions for managing notifications on multiple mobile devices.

2. Background

Today, mobile devices are common place devices used for communication. People all over the world use mobile devices to communicate with each other. Mobile devices are used everywhere both in public, and private places. These devices include numerous features and applications in addition to allowing users to make and receive calls. These features allow users to store contact information, send and receive textual messages, play games, set and track appointments, and generate task lists.

Another feature of mobile devices is the ability to select and change ring tones used to alert a user of an incoming call. Many types of ringtones are available, and although ring tones are changeable, often times, different phones in the same area will use the same ring tone. For example, several mobile phones in a crowded public area such as a train station, airport, or shopping mall may make it impossible for users to distinguish whether the call is for them or another user with the same ring tone.

SUMMARY OF THE INVENTION

A system and computer program product for autonomously selecting active notifications.

In one aspect, a computer program product is provided for use with a first mobile device. The computer program product is in communication with a computer-readable non-transitory storage medium having computer readable program code embodied thereon. When executed, the computer creates a prioritized list of notifications for a first mobile device with respect to a defined geographic area. When a second mobile device is detected in the defined area sharing a selected notification with the first mobile device, the computer program product changes the notification selection of the second mobile device and adds the changed notification to the list. When a third mobile device is detected in the defined area and is determined to share a selected notification with either the first of second mobile device, the computer program product changes the notification selection of a third mobile device to a second alternate notification that is different from any other notification in the list. The second alternate notification is added to the list. In addition to changing notification, the arrival and departure of the mobile devices from the area is negotiated. In response to any of the devices leaving the area, the computer program product removes any exclusive notification from the list. Accordingly, the computer program product autonomously enables unique notifications for each mobile device in a defined area.

In another aspect, a system is provided for management of mobile devices, and specifically their associated notifications. A processing unit is provided in communication with memory. A functional unit is provided in communication with the processing unit, and has tools to support the management of device notifications. The tools comprise a prioritization manager, a detection manager, and an activation manager. The prioritization manager creates a prioritized list of notifications for the defined area. The detection manager detects any mobile devices within the defined area, including a first mobile device, a second mobile device sharing a selected notification with the first mobile device, and a third mobile device sharing a selected notification with either the first mobile device or the second mobile device. The activation manager is in communication with the detection manager and the prioritization manager. When the second device enters the area and a conflict between notification of the first and second devices is found, the activation manager changes the selected notification of the second mobile device to a first alternate notification and adds the first alternate notification to the list. Similarly, when a third device enters the area and a conflict between the notification of the third device and either the first or second device is found, the activation manager changes the selected notification of the third mobile device to a second alternate notification that is different from both the first and second mobile device notifications, and adds the second alternate notification to the list. The activation manager further negotiates the arrival and departure of mobile devices in the defined area. Specifically, in response to a device leaving the defined area, the activation manager removes any notification exclusive to the departing mobile device from the list. Accordingly, the system maintains and manages unique selected notifications on devices in a defined area.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

Figure 1:
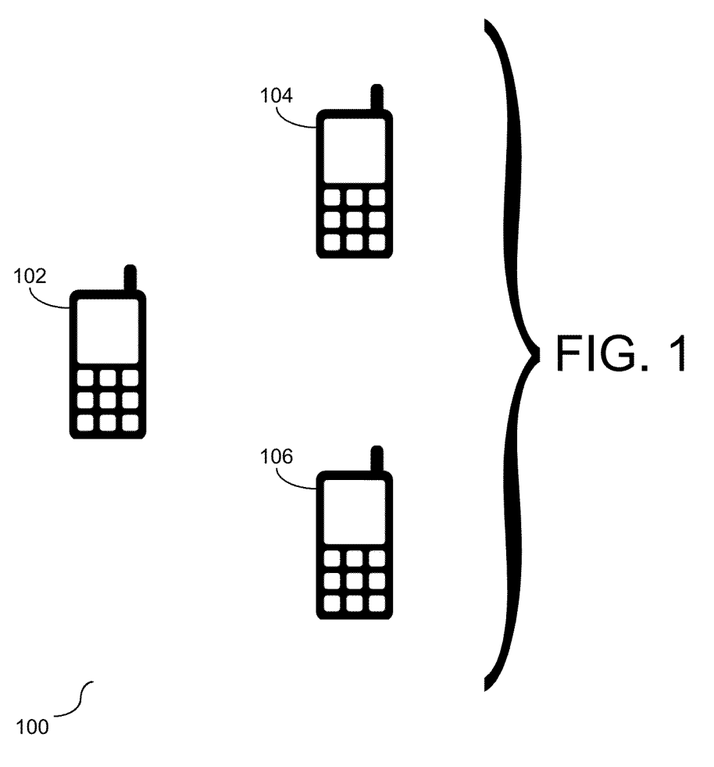
FIG. 1 is a diagram illustrating mobile devices in which the present invention may be implemented.

With reference now to the figures and in particular with reference to FIG. 1, a diagram illustrating mobile devices in which the present invention may be implemented is depicted. Mobile devices (100)-(106) are depicted as examples of devices that may be implemented. The present invention allows for distinguishing and prioritizing notifications set on different mobile devices, especially when the devices are initially set to the same ringtone.

The mechanism of the present invention allows for a mobile device, such as a mobile device (102), to change to an alternate notification if another mobile device, such as mobile device (104), in a defined geographic area is detected to share the selected notification. When mobile device (102) detects mobile device (104), mobile device (102) broadcasts a common prioritized notification list established in the defined area. In one embodiment, this common list is stored on all mobile devices in the common area. The notification may be transmitted through a short-range wireless transmission or over the Internet. In response to receiving the prioritized notification list, mobile device (104), after making any necessary changes, adds its notification identifier to the notification list.

In each instance in these illustrative examples, the mobile device is capable of choosing and assigning an alternate notification. In this manner, notifications may be automatically changed to alternate notifications and/or customized notifications to allow a user to determine when their mobile device is generating an alert.

Figure 2:
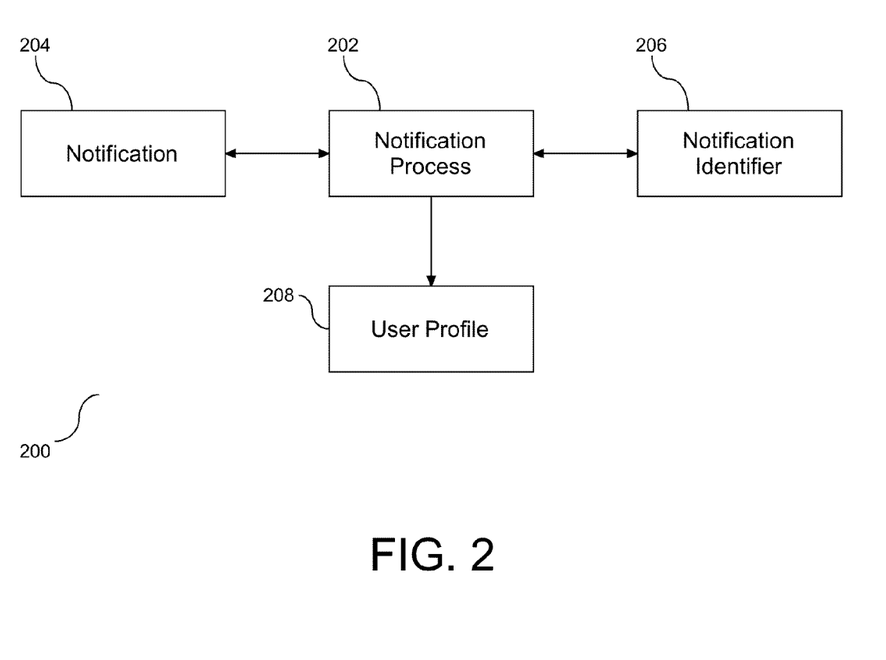
FIG. 2 is a diagram of components used to manage notifications in accordance with an embodiment of the present invention.

With reference now to FIG. 2, a diagram (200) of components used to manage notifications is depicted in accordance with a preferred embodiment of the present invention. Notification process (202) is a process used to manage notifications in a manner to allow a user to distinguish the notification of the user's mobile device from other mobile devices. Notification process (202) may be implemented as a set of instructions or circuits on a mobile device.

In this illustrative example, a default ringtone and an alternate ringtone form notifications (204). Notifications (204) also may include additional notifications. Each of these notifications may be identified through a notification identifier (206). The notification identifier (206) may be, for example, a number, alphanumeric sequence, or a name. In this example, the current notification (204) is the default ring tone for the mobile device.

Notification process (202) receives notification identifier (206) from another mobile device. In response to receiving this identifier, notification process (202) compares notification identifier (206) with the notification identifier for the current notification (204) being used in the mobile device. In one embodiment, the comparison of the notification identifiers (206) of the mobile devices takes place in real-time. The comparison may include an analysis of a selection of notification patterns of the devices. In this example, the current notification (204) is the default ring tone set for the mobile device. Notification identifier (206) may be received in response to a broadcast of a notification identifier (206) by notification process (202). Alternatively, notification identifier (206) may have been transmitted or broadcast by the other mobile device in response to detecting the mobile device in which notification process (202) is located.

If the notifications identifiers (206) are different, no action is taken to change the current notification (204) because the notification (204) of the other mobile device will not be confused with the current notification (204) of the mobile device in which notification process (202) is located. If the notification identifiers (206) are the same, notification process (202) selectively changes the current notification (204) to an alternate notification. In one embodiment, a user profile is consulted for selection of the alternate notification. Accordingly, the current notification (204) of one of the mobile devices is changed in response to ascertaining a conflict.

User profile (208) may indicate that the current notification (204) should be changed. In this case, the current notification (204) remains the same. In another example, user profile (208) may provide an alternate notification that is to be used. In a further illustrative example, user profile (208) may indicate that notification process (202) should wait for some period of time and then determine whether a mobile device is detected that has the same notification identifier (206) before changing the current notification (204) to an alternate notification. Further, user profile (208) may indicate that the user is to be prompted to use an alternate notification from notifications (204). Many other rules and preferences may be set in user profile (208) depending on the particular implementation.

When notification process (202) changes the current notification (204), an indication is provided to alert the user to the change in notifications. This indication may be, for example, a display of a name of the new notification. Another indication may be an audible alert to let the user know that the notification has changed.

Figure 3A:
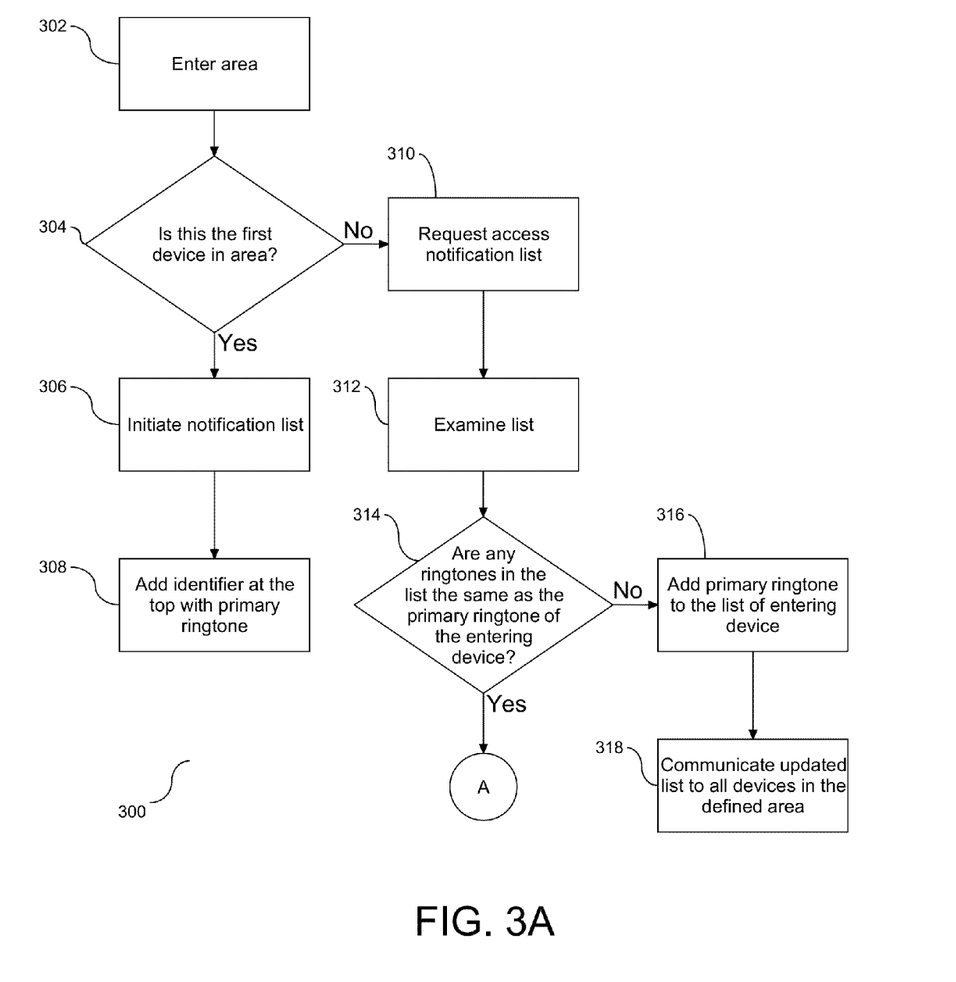
FIGS. 3A and 3B are a flow chart illustrating a method for negotiating notifications among devices upon a device entering a defined area.
Figure 3B:
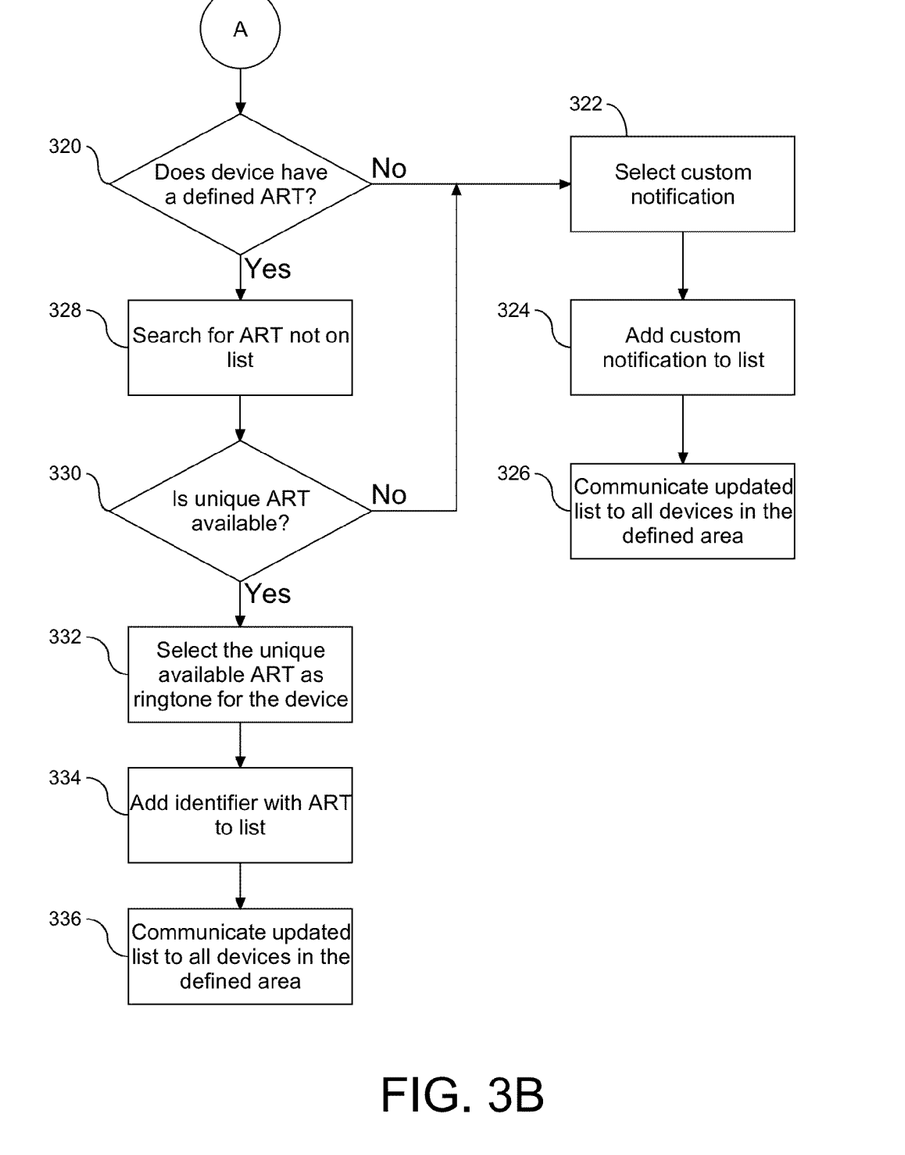

To maintain a unique ringtone on a first mobile device in an area with additional devices, an alternative notification is activated in the event a proximal second device shares an active ringtone with the first mobile device. FIGS. 3A and 3B are a flow chart illustrating a method for activating alternative notifications, such as an alternative ringtone. A mobile device enters a defined area (302). In one embodiment, the area is defined by boundaries established by a global positioning coordinate system. In one embodiment, the radius of the area is defined to be an approximated range in which the device can be heard. In another embodiment, where mobile devices are in communication over a public or private wireless local area network (WLAN), the area is defined by a broadcaster of the WLAN. In yet another embodiment, cellular towers are used to define the area. Accordingly, multiple methods may be implemented to define the area in which a mobile device is considered "proximal" and should not be limited to the embodiments described herein.

Upon entering the defined area, it is determined if the device is the first like device in the area (304). A positive response to the determination at step (304) is followed by an initiation of a prioritized notification list (306). In one embodiment, the notification list is a list of ringtones used by a mobile device. Following step (306), the primary ring tone of the first mobile device is added to the prioritized notification list along with an identifier associated with the first mobile device to associate the prioritized notification with the first mobile device in the list. In one embodiment, this primary ring tone is a ring tone currently being used by the mobile device as the default ring tone. In one embodiment, the primary ring tone is given highest priority in the prioritized notification list. Accordingly, a prioritized notification list is created in response to a first device entering a defined area and a primary ringtone is added to the list by the first device.

A negative response to the determination at step (304) is followed by a request for access to a prioritized notification list created by a different device in the area (310). The prioritized notification list is examined (312). Specifically, it is determined if there are any ringtones in the list that are the same as the primary ringtone of the entering device (314). In one embodiment, this is determined by comparing the primary ringtone of the entering device with a ringtone from the prioritized list. Specifically, the comparison involves analyzing a selection of the primary ringtone of the entering device and comparing an analyzed pattern of this ringtone with a selection of a pattern of a ringtone from the prioritized list. In one embodiment, the pattern is a digital wave pattern of a ringtone. Accordingly, the ringtones are analyzed to determine if the primary ringtone of the entering device is shared among any active ringtones or active mobile devices in the defined area.

A negative response to the determination at step (314) is followed by adding the primary ringtone of the device to the prioritized notification list along with a device identifier associated with the ringtone (316). In one embodiment, the identifier is a phone number of the mobile device with the selected ringtone. The updated notification list is either transmitted to all devices in the defined area associated with the list (318), or in one embodiment, the devices receive a signal to consult the list for an update. A positive response to step (314) is followed by a determination as to whether the device has any defined alternative ringtones (ART) for selection (320). A negative response to the determination at step (320) is followed by the selection of a custom notification (322). The custom notification may contain specific identifiers associated with the mobile device user. For example, a custom notification may be in the form of, but is not limited to, an audible recitation of the name of the user, an audible recitation of a number or identifier associated with the user, or an oral or written custom notification recorded by the user. In one embodiment, the custom notification is an action taken by the mobile device, such as a vibration by the mobile device or a generated textual notification. Following step (322), the selected custom notification is added to the prioritized notification list (324) with an identifier, and the updated prioritized notification list is sent to all devices in the area (326), or in one embodiment, the devices receive a signal to consult the list for an update. In one embodiment, an alternate custom notification is provided for selection by a mobile device where two mobile devices share a custom notification on the prioritized list. Accordingly, in the event of a match of device notifications for the define area, a custom notification may be selected where an alternative ringtone is not available.

A positive response to step (320) is followed by a search for a selectable alternative ring tone that is not on the prioritized notification list (328). In one embodiment, a prioritized list of alternate ringtones is provided by a user local to the device, and an alternative ringtone search of highest priority that is not on the prioritized notification list is conducted. It is determined if an alternate ring tone was found matching this criteria (330). A negative response is followed by a return to step (322) and a positive response is followed by selecting the available alternate ringtone for the device that is determined to match the criteria, e.g. is unique, (332). The alternate ringtone and a device identifier associated with the alternate ringtone is added to the prioritized notification list (334) followed by a transmission or communication of the list to all devices in the defined area (336). Accordingly, an alternate ringtone is selected if available and is added to the prioritized notification list.

Figure 4:
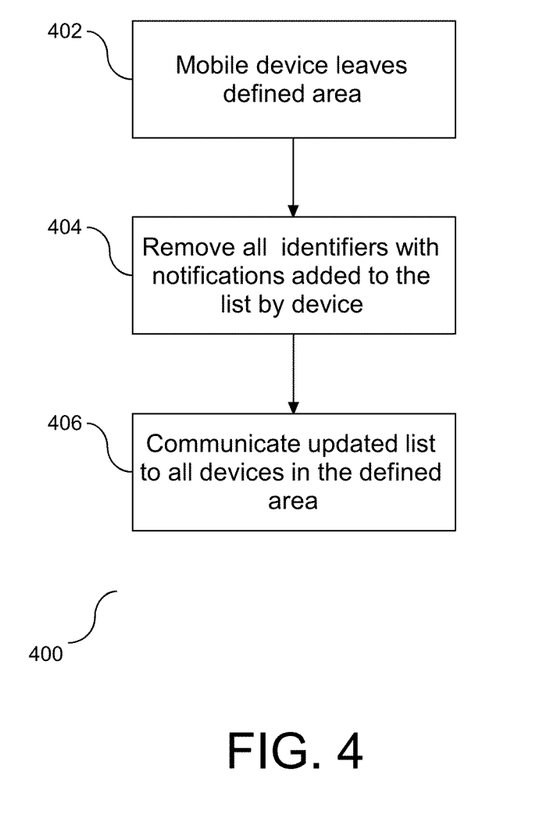
FIG. 4 is a flow chart illustrating a method for negotiating notifications among devices upon a device leaving a defined area.

As shown in FIGS. 3A and 3B, negotiation between mobile devices takes place upon a device entering the defined area. Negotiation between mobile devices also exists for a device leaving the defined area. FIG. 4 is a flow chart illustrating a method for negotiation among mobile devices responsive to a mobile device leaving the defined area. As shown, upon leaving the defined area (402), all notifications and identifiers associated with the notifications previously added to the prioritized list by the mobile device are removed from the list (404). These changes are communicated to all mobile devices in the defined area (406). In one embodiment, the updated list is transmitted to each remaining device in the area. Similarly, in one embodiment, each device remaining in the area receives a communication to consult the list for changes and/or updates. In one embodiment, a mobile device selects a new ringtone responsive to receiving the updated list (not shown). This new ringtone may be a ringtone of higher priority than the notification currently used by the mobile device. Accordingly, information associated with a device in the defined area is removed from the prioritized notification list responsive to the device leaving the defined area.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
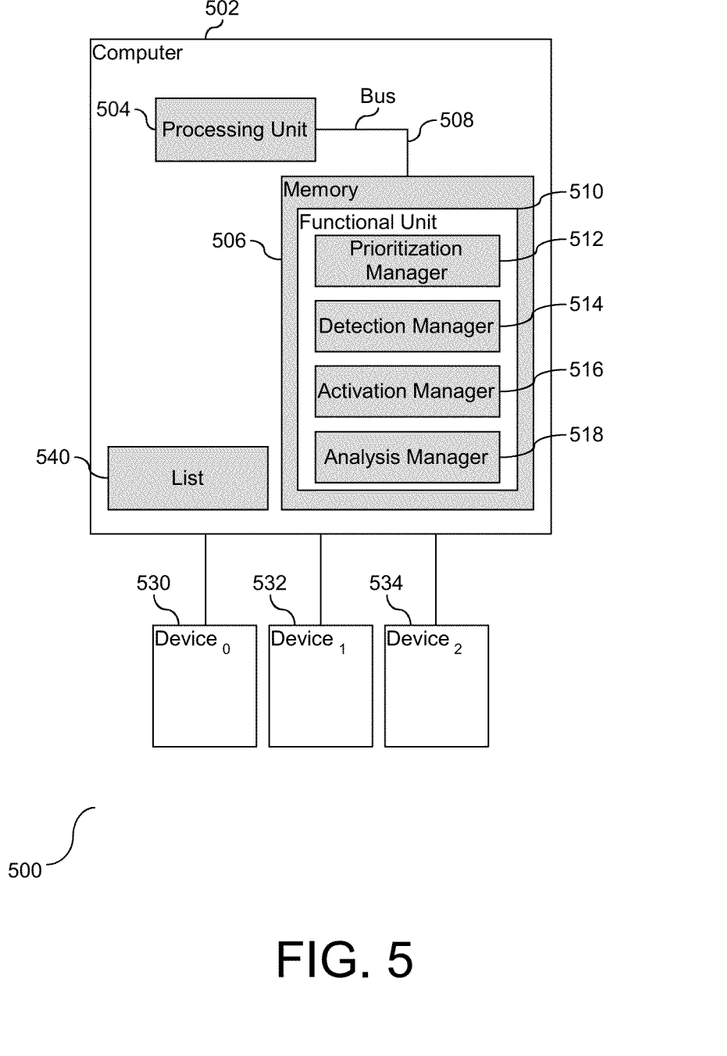
FIG. 5 depicts a block diagram illustrating a system for notification negotiation.

FIG. 5 is a block diagram (500) depicting a system for negotiation among mobile devices. A computer (502) is provided in communication with three mobile devices (530), and (532) and (534). While three mobile devices are shown, it is understood that more than three mobile devices may be implemented. The computer (502) is provided with a processing unit (504) in communication with memory (506) across a bus (508). The processing unit to carry out the processes encoded in a functional unit (510) provided in communication with memory (506). The functional unit is provided with a variety of tools for management of notification, the tools comprising: a prioritization manager (512), a detection manager (514), and an activation manager (516).

The prioritization manager (512) is provided to create a prioritized list (540) of notifications for a defined area. As shown herein, the list (540) is local to the computer (502), however this placement of the list is not limiting. In one embodiment, the list is transmitted to each of the devices (530), (532), and (534). The detection manager (514) is provided to detect a first mobile device in the defined area, a second mobile device in the defined area sharing a selected notification with the first mobile device, and a third mobile device in the defined area sharing a selected notification with one of the other detected devices. The detection manager (514) further detects any of the previously detected mobile devices leaving the defined area. The activation manager (516) is provided in communication with both the prioritization manager and the detection manager. The activation manager (516), in response to detection of the second mobile device sharing a selected notification with the first mobile device, changes the notification selection of the second mobile device to a first alternative notification, and adds the first alternate notification to the list of prioritized notifications. In one embodiment, an analysis manager (518) is provided in communication with the detection manager (514). The analysis manager conducts real-time comparison of two or more ringtones. Specifically, the analysis manager (518) analyzes a selection of a first ringtone pattern of the mobile devices and compares the analyzed pattern to a selection of a second ringtone pattern of another of the mobile devices. Similarly, the activation manager (516), in response to detection of the third mobile device sharing a selected notification with the first mobile device or the second mobile device, changes the notification selection of the third mobile device to a second alternative notification, and adds the second alternate notification to list of prioritized notifications. The activation manager (516) removes any notifications exclusive to a departing mobile device from the list responsive to the departing mobile device leaving the defined area. Accordingly, the provided tools negotiate and manage the use of notifications for mobile devices in a defined area using a prioritized notification list.

As identified above, the prioritization manager (512), detection manager (514), and activation manager (516), hereinafter referred to as tools, function as elements to support autonomous classification of textual data. The tools (512)-(516) are shown residing in memory (506) local to the data computer (502) and in communication with the mobile device (530), (532), and (534). However, the tools (512)-(516) may reside as hardware tools external to the memory (506), or they may be implemented as a combination of hardware and software. Similarly, in one embodiment, the tools (512)-(516) may be combined into a single functional item that incorporates the functionality of the separate items. As shown herein, each of the tools (512)-(516) are shown local to the computer (502). However, in one embodiment they may be collectively or individually distributed across a network or multiple machines and function as a unit to autonomously classify textual data. Accordingly, the tools may be implemented as software tools, hardware tools, or a combination of software and hardware tools.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 6:
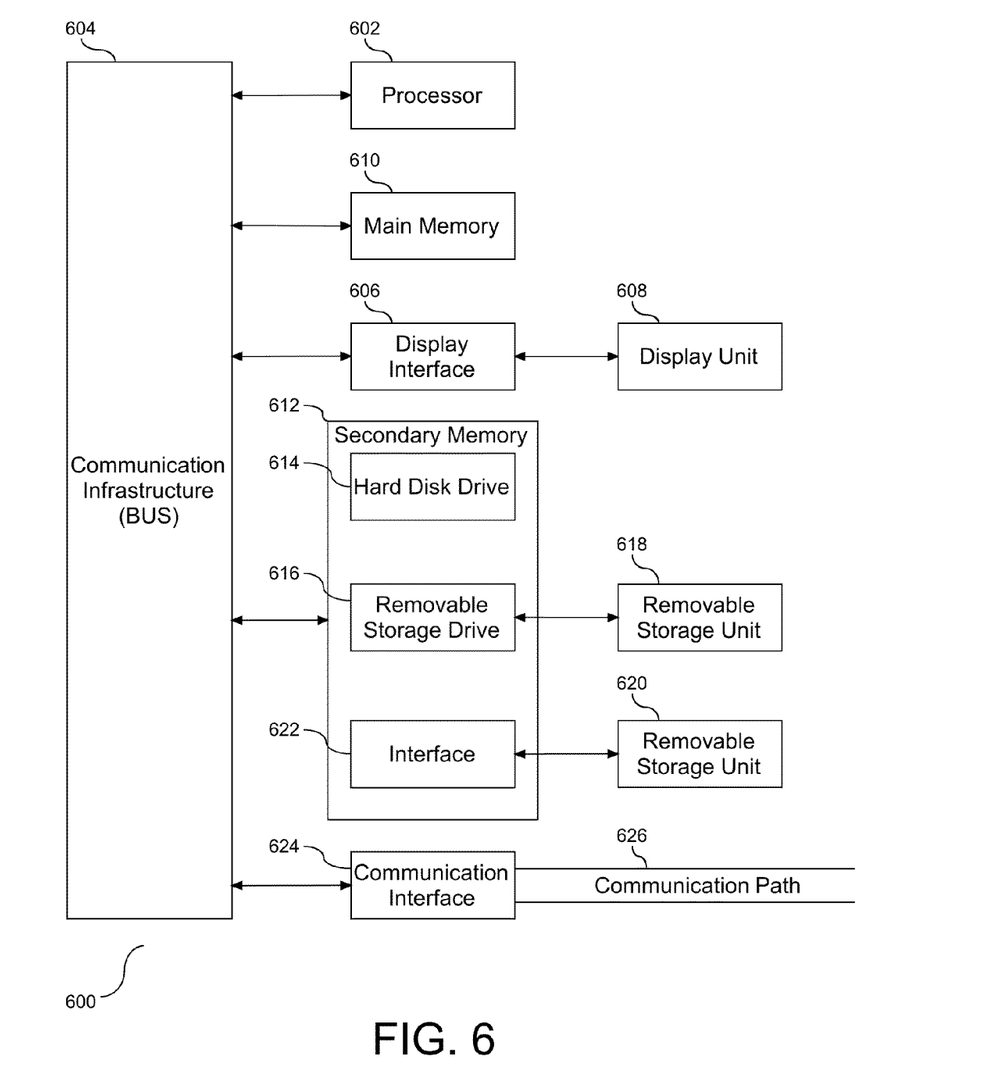
FIG. 6 depicts a block diagram illustrating a system for implementing an embodiment of the present invention.

Referring now to the block diagram (600) of FIG. 6, additional details are now described with respect to implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) (or alternative persistent storage device) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by a removable storage drive (616). As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) are in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive or alternative persistent storage device (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

ALTERNATIVE EMBODIMENT

It will be appreciated that, although specific embodiments of the invention have been described herein for purposes of illustration, various modifications may be made without departing from the spirit and scope of the invention. Specifically, the autonomous detection and selection notification for a mobile device is not limited to a mobile phone. Accordingly, the scope of protection of this invention is limited only by the following claims and their equivalents.

We claim:

1. A computer program product for use with a mobile device, the computer program product comprising a computer-readable non-transitory storage medium having computer readable program code embodied thereon, which when executed causes a computer to implement the method comprising:

creating a prioritized list of notifications for a defined area responsive to detecting a first mobile device in the area, wherein the list of notifications comprises at least one ringtone;

responsive to detecting a second mobile device in the area sharing a first selected notification with the first device, changing the first selected notification of the second device to a first alternate notification, and adding the first alternate notification to the list;

responsive to detecting a third mobile device in the defined area sharing a second selected notification with one of the first device and the second device, the detection of the third mobile device sharing the second selected notification including receipt of an electromagnetic transmission received over a network, replacing the second selected notification of the third device, wherein responsive to a second alternate notification of the third device differing from the notification selections of the first and second devices, replacing the second selected notification with the second alternate notification and adding the second alternate notification to the list, and wherein responsive to the second alternate notification of the third device being shared with the notification selections of the first and second devices, replacing the second selected notification by a first custom notification unique to the third device and adding the first custom notification to the list; and negotiating arrival and departure of mobile devices in the area, including responsive to one of the devices leaving the area, removing a priority notification exclusive to the departing mobile device from the list and updating the list to reflect a notification selection of each remaining device.

2. The computer program product of claim 1, wherein the list of notifications comprises at least one ringtone.

3. The computer program product of claim 2, further comprising program code to conduct real-time comparison of two or more ringtones, including the program code to analyze a selection of a first ringtone pattern of the mobile devices and compare the analyzed pattern to a selection of a second ringtone pattern of another of the devices.

4. The computer program product of claim 1, wherein adding a notification to the list further comprises the computer program product to add an identifier associated with the mobile device to the list.

5. The computer program product of claim 4, wherein the identifier is selected from the group consisting of: an owner name associated with the mobile device and a mobile phone number associated with the device.

6. The computer program product of claim 1, wherein the first custom notification is an action selected from the group consisting of: generating a textual notification message and a vibration.

7. A system comprising:
a processing unit in communication with memory;
a functional unit in communication with the processing unit, the functional unit having tools to manage notification activation, the tools comprising:
a prioritization manager to create a prioritized list of notifications for a defined area, wherein the list of notifications comprises at least one ringtone;
a detection manager employing the reception and transmission of an electromagnetic signal over a network, the detection manager to detect:
a first mobile device in the area;
a second mobile device in the area sharing a first selected notification with the first device;

a third mobile device in the area sharing a second selected notification with one of the first device and the second device; and one of the devices leaving the area;

an activation manager in communication with the detection manager and the prioritization manager, the activation manager to:

change the first selected notification of the second device to a first alternate notification and add the first alternate notification to the list;

replace the second selected notification of the third device, wherein responsive to a second alternate notification differing from the notification selections of the first and second devices, replace the second selected notification with the second alternate notification and add the second alternate notification to the list, wherein responsive to the second alternate notification of the third device being shared with the notification selections of the first and second devices, replace the second selected notification by a first custom notification unique to the third device and add the first custom notification to the list; and negotiate arrival and departure of devices in the defined area, including responsive to one of the devices leaving the defined area, removing a priority notification selection exclusive to the departing mobile device from the list and updating the list to reflect a notification selection of each remaining device.

8. The system of claim 7, further comprising an analysis manager in communication with the detection manager, the analysis manager to conduct real-time comparison of two or more ringtones, including the analysis manager to analyze a selection of a first ringtone pattern of the mobile devices and compare the analyzed pattern to a selection of a second ringtone pattern of another of the devices.

9. The system of claim 7, wherein adding a notification to the list further comprises the activation manager to add an identifier associated with the mobile device to the list, and wherein the identifier is selected from the group consisting of: an owner name associated with the mobile device, and a mobile phone number associated with the device.

10. The system of claim 7, wherein the first custom notification is an action selected from the group consisting of: generating a textual notification message and a vibration.

11. The computer program product of claim 1, wherein updating the prioritized notification list further comprises ordering the list based on a sequence of detecting a device entry in the area.

12. The system of claim 7, wherein updating the prioritized notification list includes ordering notification priorities based on sequence of detecting a device in the area.

13. The computer program product of claim 1, wherein the first custom notification comprises an audible recitation selected from the group consisting of: a name of the user, a number associated with the user, and an identifier associated with the user.

14. The computer program product of claim 1, wherein the first custom notification comprises a notification recorded by the user.

15. The system of claim 7, wherein the first custom notification comprises an audible recitation selected from the group consisting of: a name of the user, a number associated with the user, and an identifier associated with the user.

16. The system of claim 7, wherein the first custom notification comprises a notification recorded by the user.

17. The computer program product of claim 1, wherein the notification is an alert in response to the mobile device receiving an incoming communication.

18. The system of claim 7, wherein the notification is an alert in response to the mobile device receiving an incoming communication.

* * * * *